United States Patent
Hu et al.

(10) Patent No.: US 10,209,444 B2
(45) Date of Patent: Feb. 19, 2019

(54) ARRAYED WAVEGUIDE GRATING

(71) Applicant: HUAWEI TECHNOLOGIES CO., LTD., Shenzhen, Guangdong (CN)

(72) Inventors: Jing Hu, Shenzhen (CN); Enyu Zhou, Shenzhen (CN); Zhiguang Xu, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/016,402

(22) Filed: Jun. 22, 2018

(65) Prior Publication Data

US 2018/0299618 A1 Oct. 18, 2018

Related U.S. Application Data

(63) Continuation of application No. PCT/CN2015/098671, filed on Dec. 24, 2015.

(51) Int. Cl.
*G02B 6/12* (2006.01)
*H04B 10/27* (2013.01)
*H04J 14/02* (2006.01)

(52) U.S. Cl.
CPC ...... *G02B 6/12011* (2013.01); *G02B 6/12016* (2013.01); *H04B 10/27* (2013.01); *G02B 2006/12038* (2013.01); *G02B 2006/12061* (2013.01); *G02B 2006/12107* (2013.01); *G02B 2006/12109* (2013.01); *G02B 2006/12164* (2013.01); *H04J 14/02* (2013.01)

(58) Field of Classification Search
CPC ............ G02B 6/12011; G02B 6/12016; G02B 2006/12109; G02B 2006/12107; G02B 2006/12164; G02B 2006/12061; G02B 2006/12038; H04B 10/27; H04J 14/02
See application file for complete search history.

(56) References Cited

U.S. PATENT DOCUMENTS

2004/0047559 A1  3/2004  Lee et al.

FOREIGN PATENT DOCUMENTS

| CA | 2362653 | * | 6/2001 | ......... G02B 6/12011 |
|---|---|---|---|---|
| CN | 2595090 Y | | 12/2003 | |
| CN | 1512207 A | | 7/2004 | |
| CN | 102778730 A | | 11/2012 | |
| CN | 104170402 A | | 11/2014 | |
| KR | 20080082950 | | 9/2008 | |

* cited by examiner

*Primary Examiner* — John Bedtelyon
(74) *Attorney, Agent, or Firm* — Womble Bond Dickinson (US) LLP

(57) ABSTRACT

An arrayed waveguide grating includes an input/output waveguide 1, an input/output waveguide 2, a slab waveguide, an arrayed waveguide 1, a reflection zone 1, an arrayed waveguide 2, and a reflection zone 2. The input/output waveguide 1 and the input/output waveguide 2 are located on a same side of the slab waveguide, and are coupled to the slab waveguide. The reflection zone 1 is configured to reflect a light wave in a first band, and to transmit a light wave in a second band. The reflection zone 2 is configured to reflect the light wave in the second band. It is implemented that a single arrayed waveguide grating outputs light waves with different adjacent channel wavelength spacings, and a quantity of devices used in a system in which an uplink adjacent channel wavelength spacing and a downlink adjacent channel wavelength spacing are asymmetrical is further reduced.

16 Claims, 3 Drawing Sheets

ARRAYED WAVEGUIDE GRATING

CROSS-REFERENCE TO RELATED APPLICATIONS

This application is a continuation of International Application No. PCT/CN2015/098671, filed on Dec. 24, 2015, the disclosure of which is hereby incorporated by reference in its entirety.

TECHNICAL FIELD

The present invention relates to the field of optical fiber communications technologies, and in particular, to an arrayed waveguide grating.

BACKGROUND

A passive optical network (Passive Optical Network, PON for short) means that an optical distribution network (Optical Distribution Network, ODN for short) without any active electronic device situated between an optical line terminal (Optical line terminal, OLT for short) and an optical network unit (Optical Network Unit, ONU for short). Currently, typical structures include a dense wavelength division multiplexing passive optical network (Dense Wavelength Division Multiplexing PON, DWDM-PON for short) and a wavelength division multiplexing passive optical network (Wavelength Division Multiplexing PON, WDM-PON for short).

To reduce costs, a transmitter of the OLT uses a fixed-wavelength laser as a light source, and a transmitter of the ONU uses a variable-wavelength laser as a light source. Due to process errors, semiconductor lasers of a same design on a same wafer have operating wavelength differences by several nanometers. This difference causes a decreased yield of fixed-wavelength lasers for use in a PON system. Therefore, to increase the yield of such fixed-wavelength lasers, a downlink adjacent channel wavelength spacing in a PON needs to be appropriately increased. For example, the adjacent channel wavelength spacing needs to be increased from 100 GHz to 400 GHz. The ONU has higher costs when a variable-wavelength laser has a larger variable range. Therefore, to reduce the costs of a variable-wavelength laser on the side of the ONU, an uplink adjacent channel wavelength spacing in the PON needs to be appropriately reduced. Considering these problems, as compared with a system in which an uplink adjacent channel wavelength spacing and a downlink adjacent channel wavelength spacing are symmetrical, a system in which an uplink adjacent channel wavelength spacing and a downlink adjacent channel wavelength spacing are asymmetrical may achieve lower costs.

Two arrayed waveguide gratings (arrayed waveguide grating, AWG for short) having unequal wavelength spacings and N thin film filters (TFFs) are respectively used on a user side and a network side to implement the system in which an uplink adjacent channel wavelength spacing and a downlink adjacent channel wavelength spacing are asymmetrical in the prior art. A schematic diagram of the system is shown in FIG. 1. The TFFs are configured to demultiplex or multiplex optical signals in an uplink band and a downlink band. The two AWGs are respectively configured to demultiplex or multiplex optical signals in an uplink band and a downlink band in a PON system. A TFF first demultiplexes optical signals on an uplink band and a downlink band, and splits optical signals in the two bands, and the split optical signals respectively enter an AWG 1 and an AWG 2.

The AWG 1 and the AWG 2 are two splitting devices, and each of the AWG 1 and the AWG 2 has a working characteristic of equal adjacent channel wavelength spacings. However, the AWG 1 and the AWG 2 work in different bands respectively, and an adjacent channel wavelength spacing of the AWG 1 is unequal to an adjacent channel wavelength spacing of the AWG 2. An optical signal obtained through splitting by the AWG 1 and an optical signal obtained through splitting by the AWG 2 paired with the AWG 1 are multiplexed using the TFFs. It can be learned that more devices are used in an existing solution of the system in which an uplink adjacent channel wavelength spacing and a downlink adjacent channel wavelength spacing are asymmetrical.

SUMMARY

Embodiments of the present invention provide an arrayed waveguide grating, so that a quantity of devices used in a system in which an uplink adjacent channel wavelength spacing and a downlink adjacent channel wavelength spacing are asymmetrical can be reduced.

A first aspect of the present invention provides an arrayed waveguide grating, including a first input/output waveguide, a second input/output waveguide, a slab waveguide, a first arrayed waveguide, a first reflection zone, a second arrayed waveguide, and a second reflection zone.

In one embodiment, the first input/output waveguide and the second input/output waveguide are located on a same side of the slab waveguide, and are connected to the slab waveguide. The other side of the slab waveguide is connected to one end of the first arrayed waveguide. The other end of the first arrayed waveguide is connected to one end of a reflector of the first reflection zone. The other end of the reflector of the first reflection zone is connected to one end of the second arrayed waveguide. The other end of the second arrayed waveguide is connected to a reflector of the second reflection zone.

In one embodiment, the first reflection zone is configured to reflect a light wave in a first band, and to transmit a light wave in a second band, and the second reflection zone is configured to reflect the light wave in the second band.

In one embodiment, the first reflection zone and the second reflection zone have a wavelength selection function, so that light waves in different bands undergo different arrayed waveguide length differences when passing through the arrayed waveguide grating. The light wave in the first band is reflected in the first reflection zone, so that an arrayed waveguide length difference that the light wave in the first band undergoes is determined according to a waveguide length difference of the first arrayed waveguide. The light wave in the second band is reflected in the second reflection zone, so that an arrayed waveguide length difference that the light wave in the second band undergoes is determined according to a waveguide length difference of the first arrayed waveguide and the second arrayed waveguide.

It can be learned according to the following formula that if an input/output waveguide has a fixed interval, an adjacent channel wavelength spacing is inversely proportional to an arrayed waveguide length difference. Therefore, the light wave that is in the first band and that is output by the arrayed waveguide grating in the embodiments of the present invention and the light wave that is in the second band and that is output by the arrayed waveguide grating have different adjacent channel wavelength spacings. The formula is:

$$\frac{dx_0}{d\lambda} = -\frac{N_g(\lambda)\Delta L}{\lambda_0} * \frac{L_{FPR_0}}{n_s(\lambda)d_g^0},$$

where $x_0$ is a position of an output waveguide; $dx_0$ is an adjacent waveguide center interval at a joint between the input/output waveguide and the slab waveguide, $d\lambda$ is the adjacent channel wavelength spacing (that is, adjacent input/output waveguides), and $dx_0/d\lambda$ represents linear dispersion of the input/output waveguides, that is, in the input/output waveguides with a distance $dx_0$, a difference of optical signal center wavelengths is $d\lambda$; $N_g(\lambda)$ is a group index of refraction of an arrayed waveguide; $\Delta L$ is an adjacent arrayed waveguide length difference; $LFPR_o$ is a length of the slab waveguide; $\lambda_0$ is a center wavelength of an optical signal in the input/output waveguide; $n_s(\lambda)$ is an equivalent index of refraction of the slab waveguide; and $d_g^o$ is an adjacent waveguide center interval at a joint between the first arrayed waveguide and the slab waveguide.

A single arrayed waveguide grating provided in the embodiments of the present invention can output light waves with different adjacent channel wavelength spacings. Therefore, a quantity of devices used in a system in which an uplink adjacent channel wavelength spacing and a downlink adjacent channel wavelength spacing are asymmetrical is reduced.

In one embodiment, the arrayed waveguide grating is made of a silicon dioxide material system, that is, the first input/output waveguide, the second input/output waveguide, the slab waveguide, the first arrayed waveguide, the first reflection zone, the second arrayed waveguide, and the second reflection zone are made of a silicon dioxide material.

In one embodiment, the reflectors of the first reflection zone and the second reflection zone are thin film filters (thin film filter, TFF for short).

In one embodiment, one thin film filter is disposed respectively in the first reflection zone and the second reflection zone.

In some cases, a TFF may have a relatively large coverage area. Therefore, in one embodiment, only one TFF needs to be used in one reflection zone to reflect or transmit all light waves output by an arrayed waveguide.

In one embodiment, the arrayed waveguide grating is made of a silicon material system. That is, the first input/output waveguide, the second input/output waveguide, the slab waveguide, the first arrayed waveguide, the first reflection zone, the second arrayed waveguide, and the second reflection zone are made of a silicon material.

In one embodiment, the reflectors of the first reflection zone and the second reflection zone include waveguide Bragg grating reflectors based on a silicon material system.

In one embodiment, each waveguide in the first arrayed waveguide and the second arrayed waveguide is respectively connected to one waveguide Bragg grating reflector.

In some cases, a waveguide Bragg grating reflector can have a relatively small coverage area. Therefore, in one embodiment, a quantity of waveguide Bragg grating reflectors disposed in one reflection zone is equal to a quantity of waveguides in an adjacent arrayed waveguide. That is, each waveguide in an arrayed waveguide is respectively connected to one waveguide Bragg grating reflector.

In one embodiment, the arrayed waveguide grating is made of a mixed-material system of silicon and silicon dioxide. Specifically, the first input/output waveguide and the second input/output waveguide include a silicon-dioxide-based waveguide part and a silicon-based waveguide part. The silicon-dioxide-based waveguide part and the silicon-based waveguide part can be connected through a coupler. A silicon-based waveguide can be connected to the slab waveguide through the coupler.

It should be noted that the silicon-based waveguide in embodiments of the present invention generally means a waveguide whose material component contains silicon, but is not limited to a waveguide in which a core layer is made of pure silicon, and is a waveguide having a high refractive index difference or a "silicon-containing waveguide".

In one embodiment, the light wave in the first band is an uplink light wave, and the light wave in the second band is a downlink light wave; or, the light wave in the first band is a downlink light wave, and the light wave in the second band is an uplink light wave.

In one embodiment, the light wave in the first band includes a light wave of at least one wavelength, the light wave in the second band includes a light wave of at least one wavelength, and the light wave in the first band and the light wave in the second band have unequal wavelengths.

A second aspect of the present invention provides a passive optical network system. The system includes at least one optical network unit, a first arrayed waveguide grating, a second arrayed waveguide grating, and an optical line terminal. The first arrayed waveguide grating and the second arrayed waveguide grating are the arrayed waveguide gratings provided in the first aspect of the embodiments of the present invention.

From the perspective of an uplink direction (that is, from a user side to a network side), in one embodiment, the first arrayed waveguide grating is configured to combine light waves output by all optical network units into one long optical fiber, and the second arrayed waveguide grating is configured to split a light wave in the long optical fiber to the optical line terminal.

For the perspective of a downlink direction (that is, from the network side to the user side), in one embodiment, the second arrayed waveguide grating is configured to combine light waves output by the optical line terminal into the long optical fiber, and the first arrayed waveguide grating is configured to split a light wave in the long optical fiber to the corresponding optical network unit.

In one embodiment, on both the user side and the network side, only one arrayed waveguide grating is needed in a passive optical network system to implement a system in which an uplink adjacent channel wavelength spacing and a downlink adjacent channel wavelength spacing are asymmetrical. Compared with that two arrayed waveguide gratings and N TFFs are used in the prior art, a quantity of devices used in the system in which an uplink adjacent channel wavelength spacing and a downlink adjacent channel wavelength spacing are asymmetrical is reduced.

Embodiments of the present invention has the following beneficial effects:

A single arrayed waveguide grating is used to output light waves with different adjacent channel wavelength spacings, so that a quantity of devices used in a system in which an uplink adjacent channel wavelength spacing and a downlink adjacent channel wavelength spacing are asymmetrical is reduced.

BRIEF DESCRIPTION OF DRAWINGS

To describe embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following describes embodiments of the present invention with reference to the accompanying drawings. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
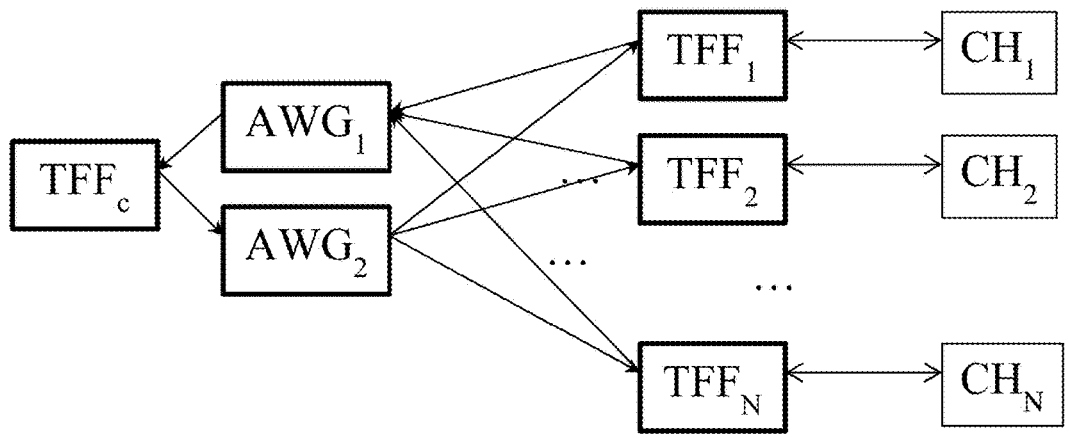
FIG. 1 is a schematic diagram of using a common AWG to implement a system in which an uplink adjacent channel wavelength spacing and a downlink adjacent channel wavelength spacing are asymmetrical.
Figure 2:
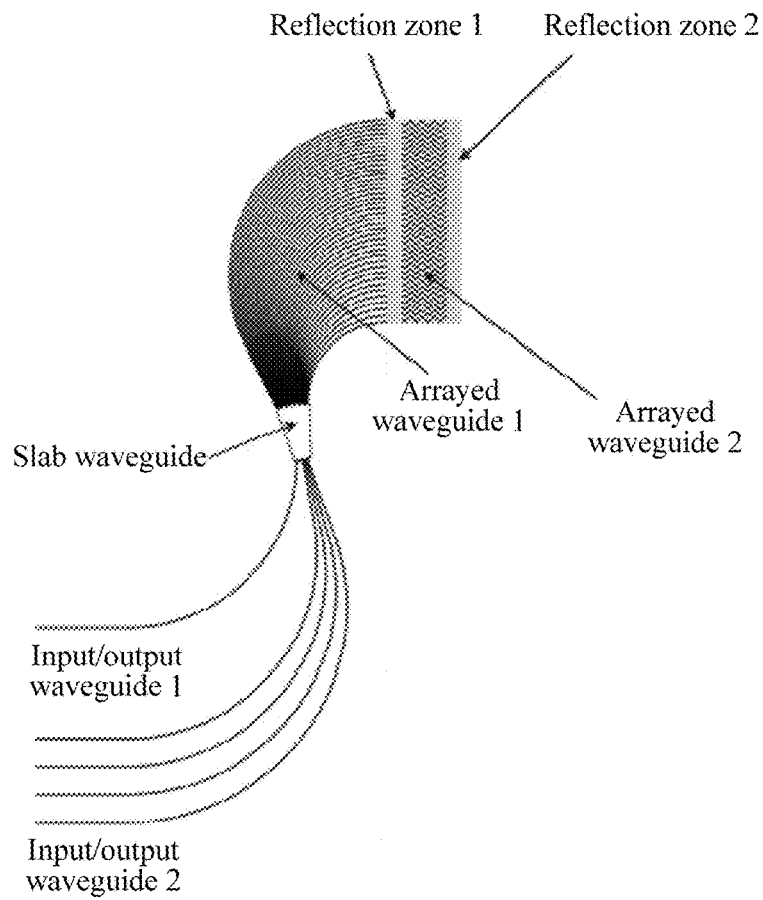
FIG. 2 is a schematic structural diagram of an AWG according to an embodiment of the present invention.

Referring to FIG. 2, FIG. 2 is a schematic structural diagram of an AWG according to an embodiment of the present invention. As shown in FIG. 2, the arrayed waveguide grating includes an input/output waveguide 1 (that is, the foregoing first input/output waveguide) and an input/output waveguide 2 (that is, the foregoing second input/output waveguide) located on a same side of a slab waveguide and are connected to the slab waveguide. The other side of the slab waveguide is connected to one end of an arrayed waveguide 1 (that is, the foregoing first arrayed waveguide). The other end of the arrayed waveguide 1 is connected to one end of a reflector of a reflection zone 1 (that is, the foregoing first reflection zone). The other end of the reflector of the reflection zone 1 is connected to one end of an arrayed waveguide 2 (that is, the foregoing second arrayed waveguide). The other end of the arrayed waveguide 2 is connected to a reflector of a reflection zone 2 (that is, the foregoing second reflection zone).

It should be noted that the input/output waveguide 1 shown in FIG. 2 includes only one waveguide. In another embodiment, the input/output waveguide 1 may include at least two waveguides.

Figure 3:
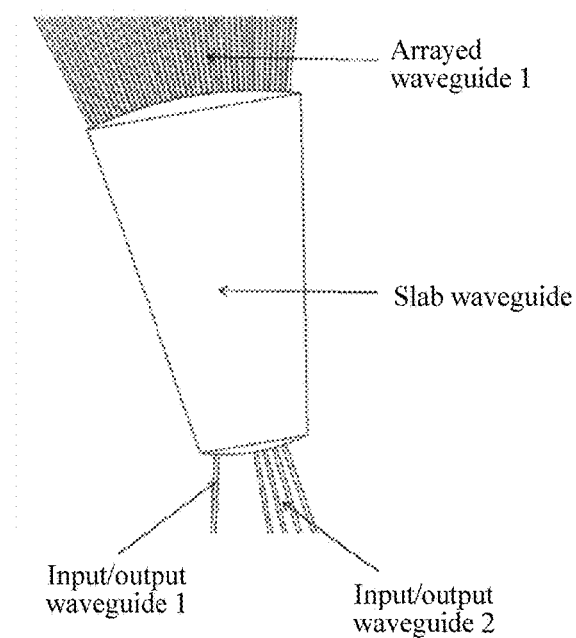
FIG. 3 is a detailed schematic diagram of a slab waveguide in an AWG according to an embodiment of the present invention.

FIG. 3 is a detailed schematic diagram of the input/output waveguide 1, the input/output waveguide 2, the slab waveguide, and the arrayed waveguide 1. A light wave that is input using the input/output waveguide 1 is output from the input/output waveguide 2. A light wave that is input using the input/output waveguide 2 is output from the input/output waveguide 1.

In one embodiment, the reflection zone 1 and the reflection zone 2 have a wavelength selection function, so that light waves in different bands undergo different arrayed waveguide length differences when passing through the arrayed waveguide grating. A light wave in a first band is reflected in the reflection zone 1, so that an arrayed waveguide length difference that the light wave in the first band undergoes is determined according to a waveguide length difference of the arrayed waveguide 1. A light wave in a second band is reflected in the reflection zone 2, so that an arrayed waveguide length difference that the light wave in the second band undergoes is determined according to a waveguide length difference of the arrayed waveguide 1 and the arrayed waveguide 2.

It can be learned according to the following formula that if the input/output waveguide 2 has a fixed interval, an adjacent channel wavelength spacing is inversely proportional to an arrayed waveguide length difference. Therefore, the light wave that is in the first band and that is output by the arrayed waveguide grating in an embodiment of the present invention and the light wave that is in the second band and that is output by the arrayed waveguide grating have different adjacent channel wavelength spacings. The formula is:

$$\frac{d_{x_0}}{d_\lambda} = -\frac{N_g(\lambda)\Delta L}{\lambda_0} * \frac{L_{FPR_0}}{n_s(\lambda)d_g^0},$$

where $x_0$ is a position of an output waveguide; $dx_0$ is an adjacent waveguide center interval at a joint between the input/output waveguide 2 and the slab waveguide, $d\lambda$ is the adjacent channel wavelength spacing (that is, adjacent input/output waveguides), and $dx_0/d\lambda$ represents linear dispersion of the input/output waveguides, that is, in the input/output waveguides with a distance $dx_0$, a difference of optical signal center wavelengths is $d\lambda$; $N_g(\lambda)$ is a group index of refraction of an arrayed waveguide; $\Delta L$ is an adjacent arrayed waveguide length difference; $LFPR_o$ is a length of the slab waveguide; $\lambda_0$ is a center wavelength of an optical signal in the input/output waveguide; $n_s(\lambda)$ is an equivalent index of refraction of the slab waveguide; and $d_g^o$ is an adjacent waveguide center interval at a joint between the arrayed waveguide 1 and the slab waveguide.

In an embodiment, the arrayed waveguide grating is made of a silicon dioxide material system, that is, the input/output waveguide 1, the input/output waveguide 2, the slab waveguide, the arrayed waveguide 1, the reflection zone 1, the arrayed waveguide 2, and the reflection zone 2 are made of a silicon dioxide material.

In such a case, the reflectors of the reflection zone 1 and the reflection zone 2 may be TFFs.

When a TFF is used in a reflection zone, one thin film filter is disposed respectively in the reflection zone 1 and the reflection zone 2.

In some cases, a TFF can have a relatively large coverage area. Therefore, in some embodiments, only one TFF needs to be used in one reflection zone to reflect or transmit all light waves output by an arrayed waveguide.

In another embodiment, the arrayed waveguide grating is made of a silicon material system. That is, the input/output waveguide 1, the input/output waveguide 2, the slab waveguide, the arrayed waveguide 1, the reflection zone 1, the arrayed waveguide 2, and the reflection zone 2 are made of a silicon material.

In such a case, the reflectors of the reflection zone 1 and the reflection zone 2 may be waveguide Bragg grating reflectors based on a silicon material system.

When a waveguide Bragg grating reflector is used in a reflection zone, each waveguide in an arrayed waveguide is respectively connected to one waveguide Bragg grating reflector.

In some cases, a waveguide Bragg grating reflector can have a relatively small coverage area. Therefore, in some embodiments, a quantity of waveguide Bragg grating reflectors disposed in one reflection zone is equal to a quantity of waveguides in an adjacent arrayed waveguide. That is, each waveguide in an arrayed waveguide is respectively connected to one waveguide Bragg grating reflector.

In still another embodiment, the arrayed waveguide grating is made of a mixed-material system of silicon and silicon dioxide. Specifically, the input/output waveguide 1 and the input/output waveguide 2 include a silicon-dioxide-based waveguide part and a silicon-based waveguide part. The silicon-dioxide-based waveguide part and the silicon-based waveguide part are connected through a coupler. A silicon-based waveguide is connected to the slab waveguide through the coupler.

It should be noted that the silicon-based waveguide in some embodiments of the present invention generally means a waveguide whose material component contains silicon, but is not limited to a waveguide in which a core layer is made of pure silicon, and is a waveguide having a high refractive index difference or a "silicon-containing waveguide".

Figure 4:
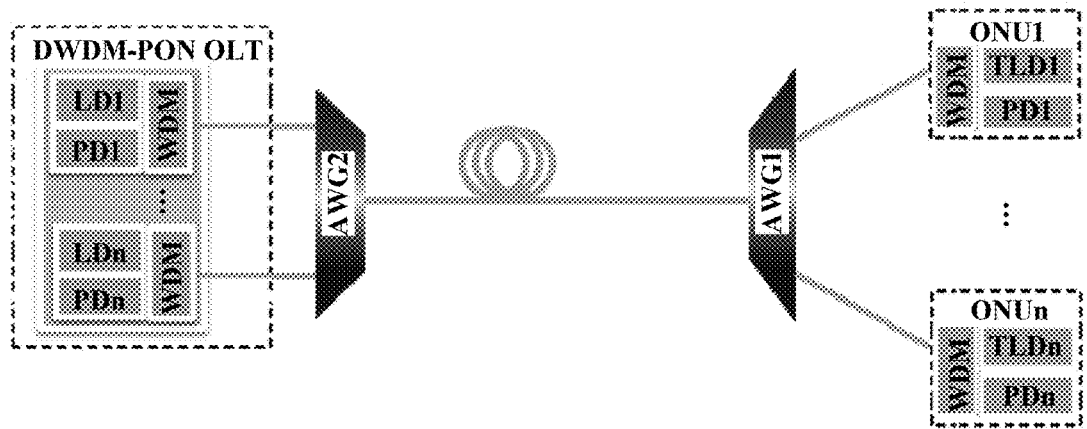
FIG. 4 is a schematic diagram of a DWDM-PON system according to an embodiment of the present invention.

The application of an AWG in some embodiments of the present invention to a PON system is analyzed in detail below. A DWDM-PON system is used as an example. Referring to FIG. 4, FIG. 4 is a schematic diagram of a DWDM-PON system according to an embodiment of the present invention.

As shown in FIG. 4, the DWDM-PON system includes at least one ONU, an AWG 1 (that is, a first arrayed waveguide grating), an AWG 2 (a second arrayed waveguide grating), and an OLT.

Refer to the description of the embodiments corresponding to FIG. 2 and FIG. 3 for the AWG 1 and the AWG 2, and details are not described herein again.

The ONU includes a TLD, a PD, and a WDM. The TLD is configured to transmit an uplink signal in the DWDM-PON system. The PD is configured to receive a downlink signal in the DWDM-PON system. The WDM is configured to multiplex or demultiplex uplink and downlink wavelengths.

The OLT includes at least one optical transceiver unit. Each optical transceiver unit can include an LD, a PD, and a WDM. The LD can be configured to transmit a downlink signal in the DWDM-PON system. The PD can be configured to receive an uplink signal in the DWDM-PON system. The WDM can be configured to multiplex and demultiplex uplink and downlink wavelengths.

It should be noted that in one embodiment of the present invention, the AWG and the OLT are independent of each other. That is, the AWG is disposed outside the OLT. In another embodiment, for ease of management, the AWG may be disposed inside the OLT.

Application of an AWG to a DWDM-PON according to some embodiments is described below respectively in an uplink direction and a downlink direction.

Uplink direction (that is, from a user side to a network side): Uplink light waves output by ONUs are input in the AWG 1 using an input/output waveguide 2 of an AWG 1. The AWG 1 combines the light waves uploaded by the ONUs, and an input/output waveguide 1 outputs the combined light waves into a long optical fiber (for example, a backbone optical fiber). After being transmitted in the long optical fiber, the combined light waves enter the AWG 2 using an input/output waveguide 1 of an AWG 2. The AWG 2 splits the light waves uploaded by the long optical fiber. The input/output waveguide 2 outputs the split light waves to an optical transceiver unit corresponding to an OLT.

It is assumed that, the light wave in the first band is an uplink light wave, and wavelengths of uplink light waves are respectively $\lambda_1$, $\lambda_2$, $\lambda_3$, and $\lambda_4$. The uplink light waves $\lambda_1$, $\lambda_2$, $\lambda_3$, and $\lambda_4$ are input in the AWG 1 using the input/output waveguide 2, sequentially pass through a slab waveguide and an arrayed waveguide 1 of the AWG 1 to enter a reflection zone 1, and are reflected in the reflection zone 1 back to the arrayed waveguide 1. After sequentially passing through the arrayed waveguide 1 and the slab waveguide, the light waves are combined into a light wave and the light wave is output using the input/output waveguide 1.

It is assumed that, the light wave in the second band is an uplink light wave, and wavelengths of uplink light waves are respectively $\lambda_5$, $\lambda_6$, $\lambda_7$, and $\lambda_8$. The uplink light waves $\lambda_5$, $\lambda_6$, $\lambda_7$, and $\lambda_8$ are input in the AWG 1 using the input/output waveguide 2, sequentially pass through the slab waveguide and the arrayed waveguide 1 of the AWG 1 to enter the reflection zone 1, are transmitted in the reflection zone 1 to an arrayed waveguide 2, pass through the arrayed waveguide 2 to enter a reflection zone 2, and are reflected in the reflection zone 2 back to the arrayed waveguide 2. After sequentially passing through the arrayed waveguide 2, the reflection zone 1, the arrayed waveguide 1, and the slab waveguide, the light waves are combined into a light wave and the light wave is output using the input/output waveguide 1.

The principle of transmitting an uplink light wave in the AWG 2 is similar, and details are not described herein again.

Downlink direction (that is, from the network side to the user side): Downlink light waves output by optical transceiver units in the OLT are input in the AWG 2 using the input/output waveguide 2 of the AWG 2. The AWG 2 combines the light waves delivered by the optical transceiver units and outputs the combined light waves to the long optical fiber (for example, a backbone optical fiber) using the input/output waveguide 1. After being transmitted by the long optical fiber, the light waves pass through the input/output waveguide 1 of the AWG 1 to enter the AWG 1. The AWG 1 splits the light waves delivered by the long optical fiber and outputs the split light waves to corresponding ONUS using the input/output waveguide 2.

It is assumed that the light wave in the first band is a downlink light wave, and wavelengths of downlink light waves are respectively $\lambda_1$, $\lambda_2$, $\lambda_3$, and $\lambda_4$. The downlink light waves $\lambda_1$, $\lambda_2$, $\lambda_3$, and $\lambda_4$ are input in the AWG 2 using the input/output waveguide 2, sequentially pass through the slab waveguide and the arrayed waveguide 1 of the AWG 2 to enter the reflection zone 1, and are reflected in the reflection zone 1 back to the arrayed waveguide 1. After sequentially passing through the arrayed waveguide 1 and the slab waveguide, the light waves are combined into a light wave and the light wave is output using the input/output waveguide 1.

It is assumed that, the light wave in the second band is a downlink light wave, and wavelengths of downlink light waves are respectively $\lambda_5$, $\lambda_6$, $\lambda_7$, and $\lambda_8$. The downlink light waves $\lambda_5$, $\lambda_6$, $\lambda_7$, and $\lambda_8$ are input in the AWG 2 using the input/output waveguide 2, sequentially pass through the slab waveguide and the arrayed waveguide 1 of the AWG 2 to enter the reflection zone 1, are transmitted in the reflection zone 1 to the arrayed waveguide 2, pass through the arrayed waveguide 2 to enter the reflection zone 2, and are reflected in the reflection zone 2 back to the arrayed waveguide 2. After sequentially passing through the arrayed waveguide 2, the reflection zone 1, the arrayed waveguide 1, and the slab waveguide, the light waves are combined into a light wave and the light wave is output using the input/output waveguide 1.

The principle of transmitting a downlink light wave in the AWG 1 is similar, and details are not described herein again.

Figure 5:
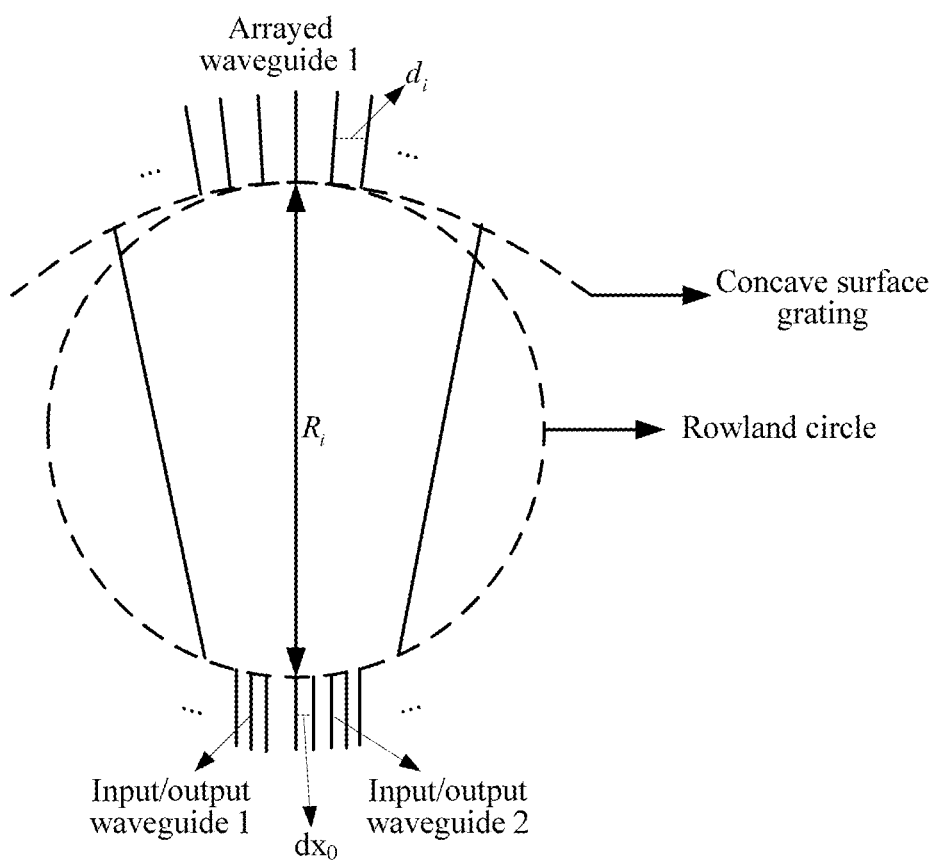
FIG. 5 is a schematic diagram of a Rowland circle of a slab waveguide in an arrayed waveguide grating.

How the AWG 1 and the AWG 2 combine light waves or split a light wave is shown in FIG. 5 according to one embodiment. Ports of the input/output waveguide 1 and the input/output waveguide 2 of the AWG are distributed on a Rowland circle with a diameter being $R_i$, and an adjacent waveguide spacing of the input/output waveguide 2 is $dx_0$. Ports of the arrayed waveguide 1 are distributed on a larger circle (generally, a radius is twice that of the Rowland circle), and an interval is $d_i$. It is assumed that light waves having different wavelengths enter through the input/output waveguide 1. The light waves have different phase differences at an outlet of the arrayed waveguide. The phase differences can be used to implement splitting or combination of light waves.

The Rowland circle is defined as follows: A series of parallel lines at an equal interval are marked on a concave spherical reflecting mirror surface to form a transmission grating that has a demultiplexing capability and a multiplexing capability. If a slit source and a concave surface grating are placed on a circumference with a diameter equal to a radius of curvature of concave surface grating, and the circle is tangential to a center G of the grating, a spectrum formed by the concave surface grating is presented on this circumference. The circle becomes a Rowland circle.

It may be understood that a person skilled in the art may understand how the reflection zone 1 and the reflection zone 2 reflect or transmit a light wave having a specific wavelength using a TFF or a waveguide Bragg grating reflector, and details are not described herein again.

A single arrayed waveguide grating provided in some embodiments of the present invention may output light waves with different adjacent channel wavelength spacings. Compared with that two existing AWGs and (N+1) TFFs (N is a quantity of operating wavelengths in a PON system) are used to output light waves with different adjacent channel wavelength spacings in the prior art, a quantity of devices used in a system in which an uplink adjacent channel wavelength spacing and a downlink adjacent channel wavelength spacing are asymmetrical is reduced.

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. An arrayed waveguide grating, comprising:
    a first input/output waveguide, a second input/output waveguide, a slab waveguide, a first arrayed waveguide, a first reflection zone, a second arrayed waveguide, and a second reflection zone, wherein
    the first input/output waveguide and the second input/output waveguide are located on a same side of the slab waveguide, and are coupled to the slab waveguide;
    the other side of the slab waveguide is coupled to one end of the first arrayed waveguide;
    the other end of the first arrayed waveguide is coupled to one end of a reflector of the first reflection zone;
    the other end of the reflector of the first reflection zone is coupled to one end of the second arrayed waveguide;
    the other end of the second arrayed waveguide is coupled to a reflector of the second reflection zone;
    the first reflection zone is configured to reflect a light wave in a first band, and to transmit a light wave in a second band; and
    the second reflection zone is configured to reflect the light wave in the second band.

2. The arrayed waveguide grating according to claim 1, wherein
    the first input/output waveguide, the second input/output waveguide, the slab waveguide, the first arrayed waveguide, the first reflection zone, the second arrayed waveguide, and the second reflection zone comprise a silicon dioxide material.

3. The arrayed waveguide grating according to claim 2, wherein the reflectors comprise thin film filters.

4. The arrayed waveguide grating according to claim 3, wherein one thin film filter is respectively disposed in the first reflection zone and the second reflection zone.

5. The arrayed waveguide grating according to claim 1, wherein the first input/output waveguide, the second input/output waveguide, the slab waveguide, the first arrayed waveguide, the first reflection zone, the second arrayed waveguide, and the second reflection zone are made of a silicon material.

6. The arrayed waveguide grating according to claim 5, wherein the reflectors comprise waveguide Bragg grating reflectors.

7. The arrayed waveguide grating according to claim 6, wherein each waveguide in the first arrayed waveguide and the second arrayed waveguide is respectively coupled to one waveguide Bragg grating reflector.

8. The arrayed waveguide grating according to claim 1, wherein
    the light wave in the first band is an uplink light wave and the light wave in the second band is a downlink light wave, or wherein the light wave in the first band is a downlink light wave and the light wave in the second band is an uplink light wave.

9. A passive optical network system, wherein the system comprises at least one optical network unit, two arrayed waveguide gratings, and an optical line terminal, and wherein each of the two arrayed waveguide gratings comprises:
    a first input/output waveguide, a second input/output waveguide, a slab waveguide, a first arrayed waveguide, a first reflection zone, a second arrayed waveguide, and a second reflection zone, wherein
    the first input/output waveguide and the second input/output waveguide are located on a same side of the slab waveguide, and are coupled to the slab waveguide;
    the other side of the slab waveguide is coupled to one end of the first arrayed waveguide;
    the other end of the first arrayed waveguide is coupled to one end of a reflector of the first reflection zone;
    the other end of the reflector of the first reflection zone is coupled to one end of the second arrayed waveguide;
    the other end of the second arrayed waveguide is coupled to a reflector of the second reflection zone;
    the first reflection zone is configured to reflect a light wave in a first band, and to transmit a light wave in a second band; and
    the second reflection zone is configured to reflect the light wave in the second band.

10. The passive optical network system according to claim 9, wherein
    the first input/output waveguide, the second input/output waveguide, the slab waveguide, the first arrayed waveguide, the first reflection zone, the second arrayed waveguide, and the second reflection zone comprise a silicon dioxide material.

11. The passive optical network system according to claim 10, wherein the reflectors comprise thin film filters.

12. The passive optical network system according to claim 11, wherein one thin film filter is respectively disposed in the first reflection zone and the second reflection zone.

13. The passive optical network system according to claim 9, wherein the first input/output waveguide, the second input/output waveguide, the slab waveguide, the first arrayed waveguide, the first reflection zone, the second arrayed waveguide, and the second reflection zone are made of a silicon material.

14. The passive optical network system according to claim 13, wherein the reflectors comprise waveguide Bragg grating reflectors.

15. The passive optical network system according to claim 14, wherein each waveguide in the first arrayed waveguide and the second arrayed waveguide is respectively coupled to one waveguide Bragg grating reflector.

16. The passive optical network system according to claim 9, wherein
the light wave in the first band is an uplink light wave and the light wave in the second band is a downlink light wave, or wherein the light wave in the first band is a downlink light wave and the light wave in the second band is an uplink light wave.

* * * * *